(12) United States Patent
Meyer (10) Patent No.: US 12,251,028 B2
(45) Date of Patent: Mar. 18, 2025

(54) SHOCK AND VIBRATION MITIGATION BASEPLATE AND METHOD OF MANUFACTURING THE SAME

(71) Applicant: Victor A Meyer, Fredericksburg, VA (US)

(72) Inventor: Victor A Meyer, Fredericksburg, VA (US)

( * ) Notice: Subject to any disclaimer, the term of this patent is extended or adjusted under 35 U.S.C. 154(b) by 63 days.

(21) Appl. No.: 18/158,684

(22) Filed: Jan. 24, 2023

(65) Prior Publication Data

US 2023/0232985 A1 Jul. 27, 2023

Related U.S. Application Data

(60) Provisional application No. 63/267,093, filed on Jan. 24, 2022.

(51) Int. Cl.
*A47C 7/00* (2006.01)
*A47C 31/00* (2006.01)
*F16M 11/22* (2006.01)

(52) U.S. Cl.
CPC ............ *A47C 7/002* (2013.01); *A47C 31/004* (2013.01); *F16M 11/22* (2013.01); *F16M 2200/08* (2013.01)

(58) Field of Classification Search
CPC ...... A47C 7/002; A47C 31/004; F16M 11/22; F16M 2200/08
See application file for complete search history.

(56) References Cited

U.S. PATENT DOCUMENTS

| | | | | |
|---|---|---|---|---|
| 2,661,943 A * | 12/1953 | Wilbur | ...................... | F16F 3/12 267/2 |
| 4,066,234 A * | 1/1978 | Nycum | ...................... | F16F 1/37 248/633 |
| 4,401,290 A | 8/1983 | Butler | | |
| 5,171,063 A * | 12/1992 | Stidd | .................... | B60N 2/0717 297/411.32 |
| 5,822,813 A | 10/1998 | Powell | | |
| 6,244,656 B1 | 6/2001 | Mueller | | |
| 6,427,965 B1 * | 8/2002 | McCracken | ......... | H01Q 1/1242 428/116 |
| 6,501,644 B1 * | 12/2002 | Silverman | .............. | G11B 33/08 361/679.36 |
| 9,332,670 B1 * | 5/2016 | Eichelberg | .............. | G06F 1/182 |
| 9,950,653 B1 | 4/2018 | Burer | | |
| 12,049,936 B2 * | 7/2024 | Pang | ........................ | F16M 5/00 |

(Continued)

OTHER PUBLICATIONS

500V5 Shock-Mitigating Pedestal Seat [online], STIDD, 2023 [retrieved on Jun. 14, 2023], Retrieved from the Internet: https://stidd.com/products/shock-mitigating-seats/500v5-shock-mitigating-pedestal-seat/.

(Continued)

*Primary Examiner* — Anita M King
(74) *Attorney, Agent, or Firm* — PATENT PORTFOLIO BUILDERS PLLC (57) ABSTRACT

Shock and vibration mitigation baseplates and related manufacturing methods. A shock and vibration mitigation baseplate includes a mounting frame configured for placement between a console operator chair and a rigid floor surface, and one or more viscoelastic polymer shock absorption and vibration dampening pads. The mounting frame houses the one or more viscoelastic polymer shock absorption and vibration dampening pads therein.

18 Claims, 5 Drawing Sheets

(56) References Cited

U.S. PATENT DOCUMENTS

2022/0250515 A1\* 8/2022 Brown ................. B60N 2/7094
2023/0248170 A1\* 8/2023 Bohm ....................... B32B 5/18
                                                              248/560

OTHER PUBLICATIONS

Operator CDS, Cleeman Navy Seats [online], Cleemann Chair—Systems GmbH, 2021 [retrieved on Jun. 14, 2023], Retrieved from the Internet: https://www.navy-seats.com/seats/unnamed-3-1.html.

\* cited by examiner

FIG. 1

(Related Art)

SHOCK AND VIBRATION MITIGATION BASEPLATE AND METHOD OF MANUFACTURING THE SAME

CROSS-REFERENCE TO RELATED APPLICATION

This application claims priority to U.S. Provisional Patent Application 63/267,093, filed in the U.S. Patent and Trademark Office on Jan. 24, 2022, the entire contents of which are herein incorporated by reference.

BACKGROUND

1. Technical Field

Embodiments relate to a shock and vibration mitigation baseplate and a method of manufacturing such a shock vibration and mitigation base plate.

2. Discussion of Related Art

Figure 1:
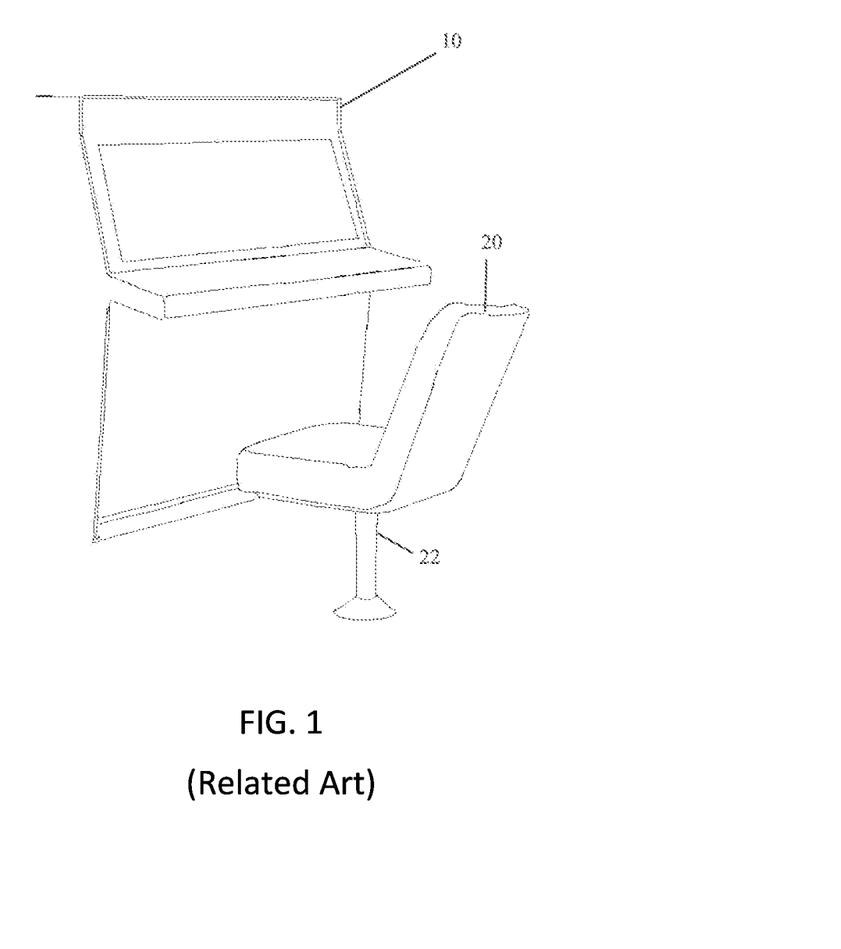
FIG. 1 is a schematic perspective view of a console and console operator chair fixedly attached to a rigid floor surface of a naval ship.

Console operator chairs are provided in various settings, including in naval ships. For example, FIG. 1 is a schematic perspective view of a console 10 and console operator chair 20 fixedly attached to a rigid floor surface of a naval ship. Existing console operator chairs are not adequately designed to absorb shock and isolate vibration encountered in combat environments. They have either a steel center-post pedestal (such as pedestal 22 shown in FIG. 1) that transfers shock loads directly to the operator's spine, or fluid-based shock absorbers such as air cylinders, and mechanical springs, which may not protect an operator's legs.

Furthermore, a typical console operator chair pedestal may not meet design standards established by various jurisdictions (e.g., military design standards). As but one specific example, with respect to specific U.S. defense standards, a typical console operator chair pedestal does not adjust to fit 95% male operator's legroom underneath the control console. This is a safety issue that can result in an explosive shock crushing the operator's thighs against the bottom of the console. It imposes unacceptable safety hazards and operability limitations on console operations and restricts the physical size of male operators.

As more examples with respect to said U.S. defense standard, existing console operator chairs do not meet Human System Integration (HSI) requirements for visibility, reach, and effective operation of console instrumentation, displays and controls. This requires the operator to bend forward to view displays and operate controls, which is fatiguing and effects system response time. The manual height and seat adjustments of existing console operator chairs are difficult to reach and operate, and they don't position the operator properly. These deficiencies impact operator effectiveness in all phases of console operations, including lack of adjustments for visibility, operability, and fatigue.

Further, in the case of fluid-based shock absorbers, and also mechanical springs, these approaches may involve moving parts and/or consumable parts complicating manufacturing and increasing maintenance requirements.

This Background section contains recognitions of one or more problems in the related art that were derived in conjunction with the embodiments presented herein. Accordingly, none of this Background section should be considered as "admitted" in the public domain prior to the effective filing date of this application.

SUMMARY

An embodiment of a shock and vibration mitigation baseplate may include a mounting frame configured for placement between a console operator chair and a rigid floor surface, and one or more viscoelastic polymer shock absorption and vibration dampening pads. The mounting frame may house the one or more viscoelastic polymer shock absorption and vibration dampening pads therein.

According to an embodiment, the mounting frame may include at least one of steel, aluminum, carbon composite, and carbon fiber material.

According to an embodiment, the mounting frame may include a bottom plate, inner members fixedly connected to the bottom plate, and outer members fixedly connected to the bottom plate. The bottom plate, the inner members, and the outer members may form a grid structure.

According to an embodiment, the mounting frame may include outer dimensions measuring about 16 inches in length by about 12 inches in width by about 1 inch in height.

According to an embodiment, the one or more viscoelastic polymer shock absorption and vibration dampening pads may include SORBOTHANE™ viscoelastic polymer pads.

According to an embodiment, the one or more viscoelastic polymer shock absorption and vibration dampening pads may include 4 viscoelastic polymer shock absorption and vibration dampening pads.

According to an embodiment, the shock and vibration mitigation base plate may further include a compression plate configured for attachment between the console operator chair and the one or more viscoelastic polymer shock absorption and vibration dampening pads.

According to an embodiment, the mounting frame may include a bottom plate, inner members fixedly connected to the bottom plate, and outer members fixedly connected to the bottom plate. The bottom plate, the inner members, and the outer members may form a grid structure. The one or more viscoelastic polymer shock absorption and vibration dampening pads include 4 viscoelastic polymer shock absorption and vibration dampening pads.

According to an embodiment, the mounting frame may include outer dimensions measuring about 16 inches in length by about 12 inches in width by about 1 inch in height.

According to an embodiment, at least one of the 4 viscoelastic polymer shock absorption and vibration dampening pads may include a height measuring about 1 inch.

According to an embodiment, each of the 4 viscoelastic polymer shock absorption and vibration dampening pads may include dimensions measuring about 10 to about 11 inches in length by about 2.5 inches in width by about 1 inch in height.

According to an embodiment, the compression plate may be constituted by a rigid structure including at least one substantially flat surface above the 4 viscoelastic polymer shock absorption and vibration dampening pads.

According to an embodiment, the compression plate may include a first plurality of holes configured for attachment to the console operator chair, and a second plurality of holes configured for attachment to the frame.

According to an embodiment, the 4 viscoelastic polymer shock absorption and vibration dampening pads including one or more shock absorption and vibration dampening properties reducing or eliminating transfer of physical forces from the mounting frame to the compression plate thereby reducing or eliminating transfer of the physical forces from the rigid floor surface to the console operator chair.

An embodiment of a shock and vibration mitigation baseplate may include a rigid mounting frame configured for placement between a console operator chair and a rigid floor surface, the rigid mounting frame including a bottom plate, inner members fixedly connected to the bottom plate, and outer members fixedly connected to the bottom plate, wherein the inner members and the outer members forming a grid structure. The shock and vibration mitigation baseplate may include a plurality of SORBOTHANE™ viscoelastic polymer pads housed within the grid structure of the rigid frame, and a compression plate configured for attachment between the console operator chair and the plurality of SORBOTHANE™ viscoelastic polymer pads.

According to an embodiment, the plurality of SORBOTHANE™ viscoelastic polymer pads housed within the grid structure of the frame may include 4 SORBOTHANE™ viscoelastic polymer pads.

According to an embodiment, the compression plate may include a first plurality of holes configured for attachment to the console operator chair, and a second plurality of holes configured for receipt of fasteners engaged with holes of the rigid frame.

An embodiment of a method of manufacturing a shock and vibration mitigation baseplate may include providing one or more frame members, providing one or more viscoelastic shock absorption and vibration dampening pads, and housing the one or more viscoelastic polymer shock absorption and vibration dampening pads within the one or more frame members to form the shock and vibration mitigation baseplate.

According to an embodiment, the one or more viscoelastic shock absorption and vibration dampening pads include 4 viscoelastic shock absorption and vibration dampening pads.

According to an embodiment, the method of manufacturing may further include providing a compression plate configured for attachment between a console operator chair and the one or more viscoelastic shock absorption and vibration dampening pads.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Embodiments will now be described with reference to the accompanying drawings. The disclosure may be embodied in many different forms and should not be construed as limited to the embodiments set forth herein. Like reference numerals refer to like elements throughout.

In the drawings, elements and their measurements may be exaggerated for ease of description and for clarity.

Use of singular forms (e.g., "a," "an," and "the") should be interpreted to include plural forms as well (and vice versa), unless the context clearly indicates otherwise.

In the specification and the claims, the term "and/or" is intended to include any combination of the terms "and" and "or" for the purpose of its meaning and interpretation. The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean any combination including "A, B, or A and B."

The terms "comprises," "comprising," "includes," and/or "including,", "has," "have," and/or "having," and variations thereof when used herein, specify the presence of stated elements, but do not preclude the presence or addition of one or more other elements. Similarly, the terms "constitute," "constituting", and the like when used herein, specify one or more elements, but do not preclude the presence or addition of one or more other elements.

The expression "configured to" used in the present disclosure may be exchanged with, for example, "suitable for", "having the capacity to", "designed to", "adapted to", "made to", or "capable of" according to the situation. For example, "configured to" may be read to refer to a structural aspect providing for such capacity.

Although the terms "first," "second," etc., may be used herein to describe various elements, these elements should not be limited by these terms. These terms are only used to distinguish one element from another element.

Terms such as "about," "generally," "substantially," and the like are to be construed as modifying a term or value such that it is not an absolute. Such terms will be defined by the circumstances and the terms that they modify as those terms are understood by those of skill in the art. This includes, at very least, the degree of expected experimental error, technique error and instrument error for a given technique used to measure a value. For example, "about" may mean within 20%, 10%, 5%, 2%, 1%, or less than 1%.

Absorbing shock and dampening vibration effects experienced by operators seated at control consoles are critical factors in ensuring personnel survivability and weapons system operability in combat.

Embodiments of a shock and vibration mitigation baseplate (also referred to as "baseplate") provide innovative and adaptable designs for structurally mounting a diverse variety of military and commercial operator chairs where mitigation of shock and vibration is required. Embodiments respond to a mission-critical need to protect the operator and improve his/her survivability and performance from shock and vibration forces due to explosions, ship collision, and violent motion in heavy seas. Embodiments may also be flexible and adaptable to new operator chairs specifically designed and tested to meet Human System Engineering (HSE) and Human System Integration (HSI) standards.

Figure 2:
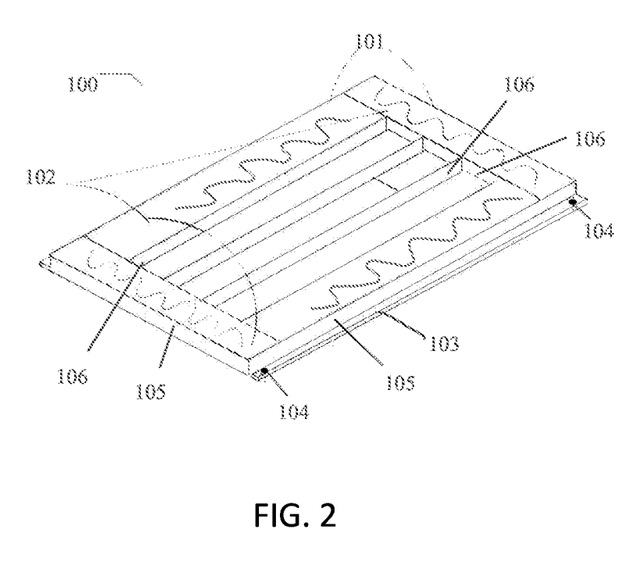
FIG. 2 is a schematic perspective view of a shock and vibration mitigation baseplate according to an embodiment.
Figure 3:
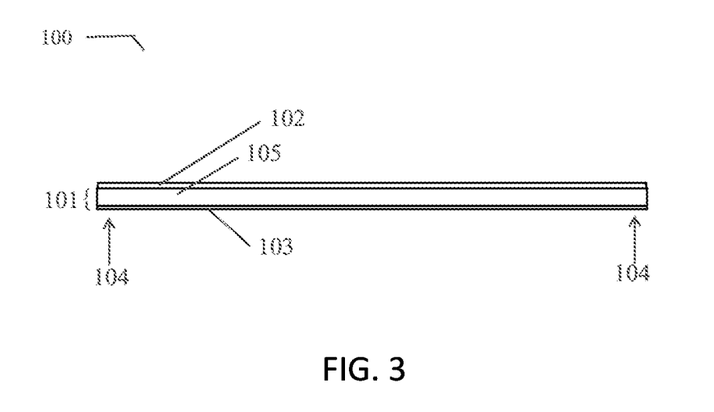
FIG. 3 is a schematic side view of a shock and vibration mitigation baseplate according to an embodiment.
Figure 4:
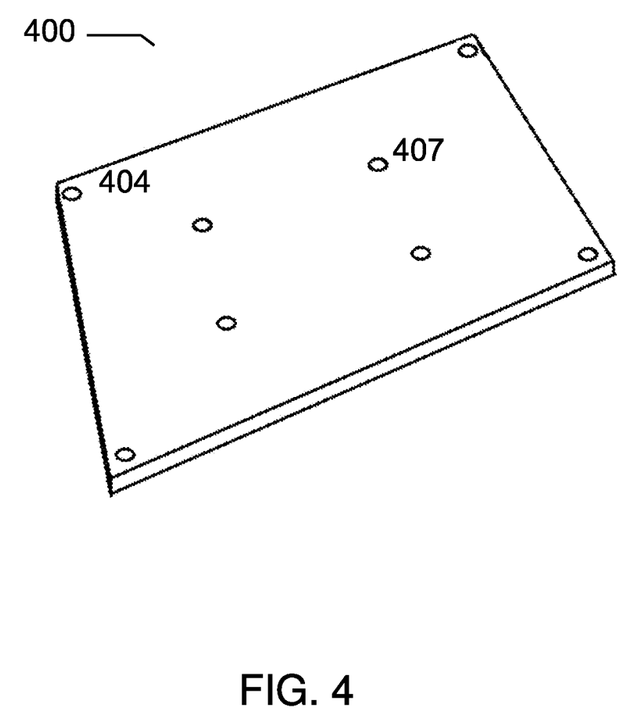
FIG. 4 is a schematic perspective view of a compression plate of the vibration mitigation baseplate according to an embodiment.

FIG. 2 is a schematic perspective view of a shock and vibration mitigation baseplate 100 according to an embodiment. FIG. 3 is a schematic side view of a shock and vibration mitigation baseplate 100 according to an embodiment. FIG. 4 is a schematic perspective view of a compression plate 400 of the vibration mitigation baseplate 100 according to an embodiment.

It should be borne in mind at this point in the description that the figures merely show example embodiments arranged according to one possible orientation. For example, an embodiment of the shock and vibration mitigation baseplate 100 may be installed upside down from what is shown in the figures, depending on an application case. Accordingly, terms such as "bottom plate" are relative in nature and merely for purposes of description and not limitation.

A shock and vibration mitigation baseplate 100 may be a compact fully integrated assembly comprised of a mounting frame 101 (e.g., at least one of steel, aluminum, carbon composite, and carbon fiber) and advanced technology shock absorbing and vibration dampening pads, i.e., viscoelastic polymer shock absorption and vibration dampening pads 102. For example, viscoelastic polymer shock absorption and vibration dampening pads 102 may include viscoelastic polymer pads by SORBOTHANE™ (SORBOTHANE™ viscoelastic polymer pads).

The mounting frame 101 and viscoelastic polymer shock absorption and vibration dampening pads 102 may operate synergistically to improve operator survivability and enhance the visibility, reach, and effective operation of system instrumentation, displays, and controls. Embodiments may enable operators to survive and maintain combat effectiveness under arduous operating conditions. Embodiments may insert and engage the operator in the battle problem.

According to another embodiment including a chair pedestal, a baseplate 100 may include forward-backward, up-down, and an about 90 degree to about 180 degree swivel plate for ease of access to fully accommodate all body sizes. This may allow the operator to adjust for body profiles of 95-percent male and 5-percent female and with ample clearances to view and operate controls without bending forward.

These embodiments may meet all of the shock and vibration requirements of HSE and all of the ergonomic requirements of HSI. Embodiments may allow an operator to change position in place to maintain alertness, adjust for fatigue, and reduce seasickness.

According to an embodiment, a shock and vibration mitigation baseplate 100 may include a mounting frame 101, and one or more viscoelastic polymer shock absorption and vibration dampening pads 102 (e.g., SORBOTHANE™ viscoelastic polymer pads), which provide shock absorption and vibration isolation and dampening. In another embodiment, the compression plate 400 may be provided as part of the shock and vibration mitigation baseplate 100. The compression plate 400 may be configured for attachment between the console operator chair and the one or more viscoelastic polymer shock absorption and vibration dampening pads.

These components combine to distribute the force of the shock wave to the periphery of the mounting frame 101 thereby bypassing and cushioning the operator up to about 95 percent. These components are innovatively combined to produce an integrated, adaptable shock and vibration mitigation baseplate system design.

The mounting frame may include a bottom plate upon which inner and outer members 105, 106 may be fixedly connected. For example, the inner and outer members 105, 106 may be welded to the bottom plate. In another embodiment, the bottom plate and inner and outer members may be integral with each other. In an embodiment, the mounting frame 101 may include protruding edge members 103 of the bottom plate. The protruding edge members 103 may include holes 104 for attaching a console operator chair to a rigid floor surface (e.g., a flooring surface of a naval ship) with the baseplate 100 disposed therebetween. In another embodiment, the mounting frame 101 may include additional holes/fasteners (in addition to holes 104) for attachment to the console operator chair. For example, the compression plate 400 may be provided including said additional holes/fasteners 407 (e.g., in the pattern of a seat support). In yet another embodiment, a shock absorbing chair pedestal may be attached to the mounting frame 101 for additional shock/vibration mitigation.

In an embodiment, the mounting frame 101 may be a shock-tested and crash-certified steel mounting frame. As noted above and below, other materials are possible. The mounting frame 101 may include holes for attaching a console operator chair, mounting surfaces and/or holes for attaching adjustable shock absorbers, and a grid structure for mounting viscoelastic polymer shock absorption and vibration dampening pads 102. The measurements (e.g., outer dimensions) of the mounting frame may fall within a range of about 10 inches to about 25 inches long/length (L) by about 6 inches to about 16 inches wide/width (W) by about 0.5 inches to about 3 inches high/height/depth (H). For example, an embodiment of the mounting frame may be constituted by a steel grid structure having outer dimensions measuring, for example, about 16 inches L by about 10 inches W (e.g., excluding protruding edge members 103)× about 1-inch H. That is, including the protruding edge members 103 of the bottom plate, the grid structure (mounting frame) may have outer dimensions measuring about 16 inches L by about 12 inches W by about 1-inch H. The bottom plate may range in thickness or height from about 1/160 of an inch to 1 inch. In an embodiment, the bottom plate including the protruding edge members 103 may have a thickness or height measuring about 0.25 inches.

Accordingly, when the pads 102 having a height measuring about 1-inch are inserted, the overall shock and vibration mitigation baseplate may measure, for example, about 16 inches L by about 12 inches W by about 1.25 inches H (1-inch pad height, 25 inch bottom plate height). In another embodiment including the compression plate 400 having a thickness measuring about 0.25 inches, the overall shock and vibration mitigation base plate may measure, for example, about 16 L by about 12 inches W by about 1.5 inches H (1-inch pad height, 0.25 inch bottom plate height, 0.25 inch compression plate 400 height).

Other embodiments of the mounting frame 101 may include high-strength aluminum where weight is an issue. In yet other alternative embodiments, the mounting frame may include composite materials such as carbon composite and carbon fiber.

The mounting frame 101 may include outer members 105 (e.g., flat metal bars, composite members, etc.,). The outer members 105 may be fixedly attached to the bottom plate so as to form a quadrilateral shape. The protruding edge members 103 (those portions of the bottom plate extending beyond the outer members 105) may extend from the sides of, e.g., two outer members 105. The mounting frame may include inner members 106 (e.g., flat metal bars, composite members, etc.) fixedly attached (e.g., welded, bolted, etc.) to each other and outer members 105 and the bottom plate in a grid structure. The height measurement of the outer and inner members may range from 0.5 inches to 2.5 inches. In an embodiment, the height of the outer and inner members may measure about 0.75 inches. The thickness measurement of the outer and inner members may range from 1/160 of an inch to 1 inch. For example, in an embodiment, the thickness of the outer and inner members may measure about 1/16 of an inch. The grid structure may define recesses for housing (e.g., receiving or mounting) viscoelastic polymer shock absorption and vibration dampening pads 102.

In an embodiment where the height of the outer and inner members 105, 106 measures about 0.75 inches and the bottom plate has a thickness measurement of 0.25 inches, a top portion of the pads 102 may rise above a top surface of the inner and outer frame members 105, 106. For example, the top about 0.25 inch of the pads 102 may be disposed above the top surface of the inner and outer frame members 105, 106. When the compression plate 400 is added on top of the top surface of the pads 102, 0.25 inch of the pads above the inner and outer frame members and below the compression plate 400 may be exposed thereby enabling the viscoelastic polymer shock absorption and vibration dampening pads the ability to compress sufficient to absorb and redirect energy. In other embodiments, similar gaps (spaces) may be provided between other components (e.g., the inner/outer members and the pads) to facilitate pad compression/expansion.

Specifically, fasteners (e.g., mounting bolts) may be inserted through holes 404 of the compression plate 400 and through holes 104 of the protruding edge members 103 into holes of, e.g., a deck of a ship. The viscoelastic polymer shock absorption and vibration dampening pads 102 may be sandwiched in between the compression plate 400 and the bottom plate of the mounting frame 101 leaving a portion (e.g., a top portion) of the pads to be exposed above the tops of the inner and outer members and below the compression plate. The holes 404 and 104 may enable compression of the viscoelastic polymer shock absorption and vibration dampening pads to compress vertically thereby redirecting energy within the pads even to the point of the compression plate contacting the top of the inner and outer members.

It should be borne in mind at this point in the description that the dimensions of the mounting frame and the dimensions of the pads may be related. For example, where the outer and inner members of the mounting frame measure about 1/16 of an inch in thickness and a pad is described as being about 10 inches in length, the total measure of the mounting frame including two frame members may be 10 and 1/8 inches, or in another embodiment, the pad being described as about 10 inches in length may be 9 and 7/8 L and the total measure of the pad including 2 mounting frame members may be 10 inches, as may be suitable for implementation.

The viscoelastic polymer shock absorption and vibration dampening pads 102 may provide vertical and 360-degree horizontal shock absorption and vibration dampening. For example, in an embodiment, viscoelastic polymer pads provided under the SORBOTHANE trademark by Sorbothane, Incorporated, 2144 State Route 59 Kent, Ohio, 44240 may be used. Such SORBOTHANE™ pads are made from viscoelastic polymer, which combines shock absorption and vibration isolation and dampening, and desirable memory characteristics. Viscoelastic polymer pads such as those by SORBOTHANE™ may lower the natural frequency and may determine the shape factor. One or more pads 102 may be provided. In an embodiment, four separate pads 102 may be provided. The measurements of the pads may fall within a range of about 10 inches (e.g., 9 and 7/8 inches) to about 25 inches (L) by about 1 to about 5 inches (W) by about 0.6 inches to about 3.5 inches (H). For example, two of the pads may measure about 10 inches long/length (L) by about 2.5 inches wide/width W by about 1 inch high/height/depth (H) and may produce a shape factor of 1, while two others of the pads may measure about 11 inches L by about 2.5 inches W by about 1 inch H.

The expression "shape factor" is a term of art used in the design of elastomer products that quantifies the unique ability of elastomers to react unidirectionally to an applied force by bulging at 90 degrees to the direction of the applied force. This is an attribute in mitigating shock from underwater explosions and improvised explosive devices (IEDs). These features may support other embodiments which could include a stable writing surface, a drink holder, a communications selection panel, and any device benefiting from shock and vibration-free mounting.

Viscoelastic polymer shock absorption and vibration dampening pads 102 may be comprised of a thermoset viscoelastic polyurethane material, which has a very high damping coefficient in a stable material with a long fatigue life and low creep rate compared to other polymers (rubber, neoprene, silicone, etc.). Thermoset viscoelastic polyurethane material may have a desirable damping coefficient, and may have about 10 percent to about 20 percent impact deflection at about 90-degrees to the applied force over a very wide temperature range of about −20° F. to about +160° F. Viscoelastic polymer shock absorption and vibration dampening pads 102 may be water resistant. Unlike fluid-based shock absorbers or foam products, viscoelastic polymer pads 102 may absorb shock efficiently for numerous cycles (e.g., millions) eliminating the need for metal springs to return the system to its equilibrium position after absorbing a shock.

Figure 5:
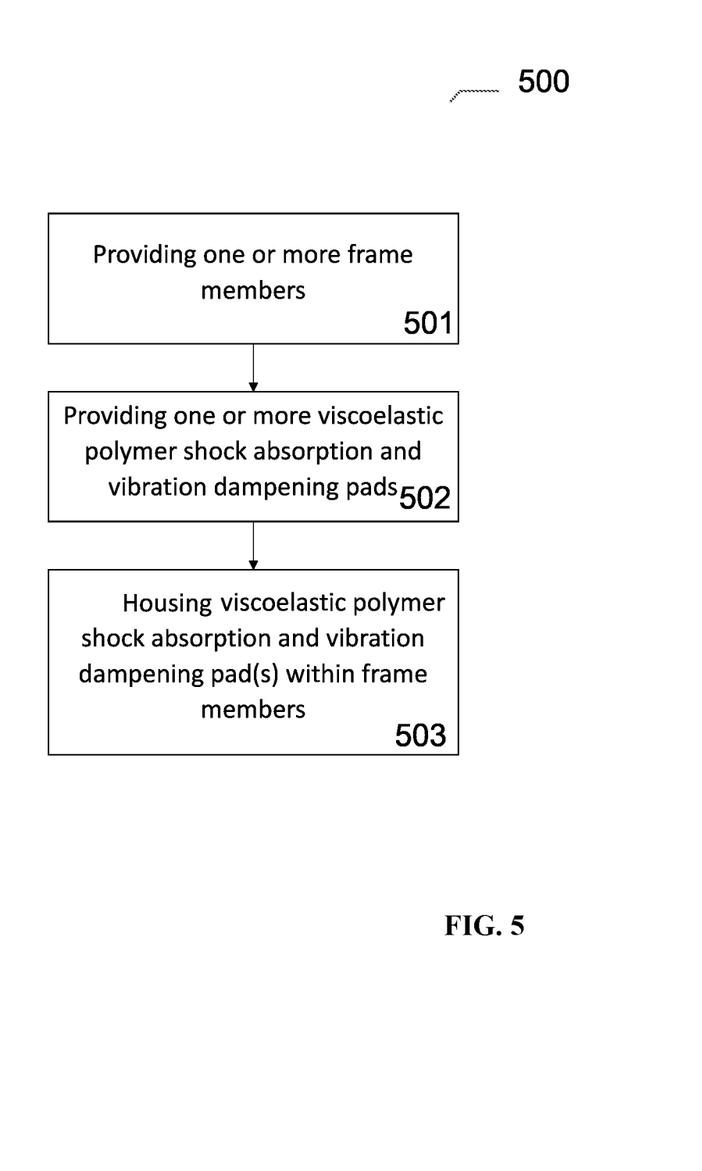
FIG. 5 is a schematic flowchart of a method of manufacturing a shock and vibration mitigation baseplate according to an embodiment.

FIG. 5 is a schematic flowchart of a method 500 of manufacturing a shock and vibration mitigation baseplate 100 according to an embodiment. In describing the method 500 as an example, reference is made to components disclosed in earlier figures for clarity and not for purposes of limitation.

In operation 501, one or more frame members 105, 106 may be provided. For example, frame members 105, 106 of a mounting frame 101 may be provided.

In operation 502, one or more viscoelastic polymer shock absorption and vibration dampening pads 102 may be provided. For example, four viscoelastic polymer shock absorption and vibration dampening pads 502 may be provided.

In operation 503, the one or more viscoelastic polymer shock absorption and vibration dampening pads 102 may be housed within the one or more frame members 105/106. For example, four viscoelastic polymer shock absorption and vibration dampening pads 102 may be housed within the frame members 105/106 of the mounting frame 101.

The method 500 may include additional operations as may be necessary in manufacturing the embodiments herein. For example, the method 500 may include providing a bottom plate and a compression plate 400.

A shock and vibration mitigation baseplate corrects the deficiencies existing in current console operator chairs with an innovative and flexible baseplate design that absorbs shock, dampens vibration, and significantly improves operator survivability, visibility and operability of combat system instrumentation, displays, and controls.

Further, embodiments of the shock and vibration mitigation baseplate involve no moving parts simplifying manufacture and decreasing maintenance requirements.

All of these and other advantages and benefits of the embodiments will be apparent to one of ordinary skill in the art based on this disclosure.

Embodiments have been disclosed herein, and although terms are employed, they are used and are to be interpreted in a generic and descriptive sense only and not for purpose of limitation. In some instances, as would be apparent by one of ordinary skill in the art, elements described in connection with an embodiment may be used singly or in combination with elements described in connection with other embodiments. Accordingly, it will be understood by those of ordinary skill in the art that various changes in form and details may be made without departing from the spirit and scope of the disclosure as set forth in the following claims including equivalents thereof.

What is claimed is:

1. A shock and vibration mitigation baseplate, comprising:
   a mounting frame configured for placement between a console operator chair and a rigid floor surface; and
   one or more viscoelastic polymer shock absorption and vibration dampening pads, wherein
   the mounting frame houses the one or more viscoelastic polymer shock absorption and vibration dampening pads therein,
   the mounting frame includes:
      a bottom plate;
      inner members fixedly connected to the bottom plate; and
      outer members fixedly connected to the bottom plate, and
   the bottom plate, the inner members, and the outer members form a grid structure.

2. The shock and vibration mitigation baseplate of claim 1, wherein the mounting frame includes at least one of steel, aluminum, carbon composite, and carbon fiber material.

3. The shock and vibration mitigation baseplate of claim 1, wherein the mounting frame includes outer dimensions measuring about 16 inches in length by about 12 inches in width by about 1 inch in height.

4. The shock and vibration mitigation baseplate of claim 1, wherein the one or more viscoelastic polymer shock absorption and vibration dampening pads include 4 viscoelastic polymer shock absorption and vibration dampening pads.

5. The shock and vibration mitigation baseplate of claim 1, further comprising:
   a compression plate configured for attachment between the console operator chair and the one or more viscoelastic polymer shock absorption and vibration dampening pads.

6. The shock and vibration mitigation baseplate of claim 5,
   the one or more viscoelastic polymer shock absorption and vibration dampening pads include 4 viscoelastic polymer shock absorption and vibration dampening pads.

7. The shock and vibration mitigation baseplate of claim 6, wherein the mounting frame includes outer dimensions measuring about 16 inches in length by about 12 inches in width by about 1 inch in height.

8. The shock and vibration mitigation base plate of claim 7, wherein at least one of the 4 viscoelastic polymer shock absorption and vibration dampening pads includes a height measuring about 1 inch.

9. The shock and vibration mitigation base plate of claim 8, wherein each of the 4 viscoelastic polymer shock absorption and vibration dampening pads includes dimensions measuring about 10 to about 11 inches in length by about 2.5 inches in width by about 1 inch in height.

10. The shock and vibration mitigation baseplate of claim 9, wherein the compression plate is constituted by a rigid structure including at least one substantially flat surface above the 4 viscoelastic polymer shock absorption and vibration dampening pads.

11. The shock and vibration mitigation baseplate of claim 10, wherein the compression plate includes:
    a first plurality of holes configured for attachment to the console operator chair; and
    a second plurality of holes configured for attachment to the frame.

12. The shock and vibration mitigation baseplate of claim 11, wherein the 4 viscoelastic polymer shock absorption and vibration dampening pads including one or more shock absorption and vibration dampening properties reducing or eliminating transfer of physical forces from the mounting frame to the compression plate thereby reducing or eliminating transfer of the physical forces from the rigid floor surface to the console operator chair.

13. A shock and vibration mitigation baseplate, comprising:
    a rigid mounting frame configured for placement between a console operator chair and a rigid floor surface, the rigid mounting frame including:
    a bottom plate;
    inner members fixedly connected to the bottom plate; and
    outer members fixedly connected to the bottom plate,
    the inner members and the outer members forming a grid structure,
    a plurality of viscoelastic polymer pads housed within the grid structure of the rigid frame; and
    a compression plate configured for attachment between the console operator chair and the plurality of viscoelastic polymer pads.

14. The shock and vibration mitigation baseplate of claim 13, wherein the plurality of viscoelastic polymer pads housed within the grid structure of the frame include 4 viscoelastic polymer pads.

15. The shock and vibration mitigation baseplate of claim 14, wherein the compression plate includes:
    a first plurality of holes configured for attachment to the console operator chair; and
    a second plurality of holes configured for receipt of fasteners engaged with holes of the rigid frame.

16. A method of assembling a shock and vibration mitigation baseplate, including:
    providing one or more frame members;
    providing one or more viscoelastic shock absorption and vibration dampening pads; and
    housing the one or more viscoelastic shock absorption and vibration dampening pads within the one or more frame members to form the shock and vibration mitigation baseplate, wherein
    the one or more frame members include;
       a bottom plate;
       inner members fixedly connected to the bottom plate; and
       outer members fixedly connected to the bottom plate, and
    the bottom plate, the inner members, and the outer members form a grid structure.

17. The method of assembling a shock and vibration mitigation baseplate of claim 16, wherein the one or more viscoelastic shock absorption and vibration dampening pads include 4 viscoelastic shock absorption and vibration dampening pads.

18. The method of assembling a shock and vibration mitigation baseplate of claim 17, further comprising:
  providing a compression plate configured for attachment between a console operator chair and the one or more viscoelastic shock absorption and vibration dampening pads.

\* \* \* \* \*